United States Patent
Nicholson et al.

[15] 3,661,192
[45] May 9, 1972

[54] PERIPHERAL CHIPPER FOR ROUND LOG SECTIONS

[72] Inventors: Thomas W. Nicholson, Mercer Island; Ray B. Jorgensen; Stanley Donald Vanek, both of Seattle, all of Wash.

[73] Assignee: Nicholson Manufacturing Company, Seattle, Wash.

[22] Filed: Dec. 8, 1969

[21] Appl. No.: 883,038

[52] U.S. Cl. ............................................ 144/176, 241/93
[51] Int. Cl. ..................................................... B27l 11/02
[58] Field of Search ..................... 144/162, 172, 326, 237; 241/93, 294

[56] References Cited

UNITED STATES PATENTS

| 335,532 | 2/1886 | Ott | 241/93 |
|---|---|---|---|
| 3,219,076 | 11/1965 | Logan et al. | 144/172 X |
| 3,559,705 | 2/1971 | Salzmann | 144/162 R |
| 1,209,319 | 12/1916 | Mitts | 144/172 X |

*Primary Examiner*—Donald R. Schran
*Attorney*—Robert W. Beach

[57] ABSTRACT

A rotating chipping drum carrying a spiral row of bits is mounted in a hollow body with a portion of its periphery exposed to a chipping chamber for holding log sections to be chipped. The rotative axis of the chipping drum may be inclined to urge a log section toward one end of the chipping chamber. Each bit includes side plate portions arranged at dihedral angles to a central plate portion and is clamped between bit-holding blocks with the bit cutting edge projecting beyond the periphery of the chipping drum.

6 Claims, 26 Drawing Figures

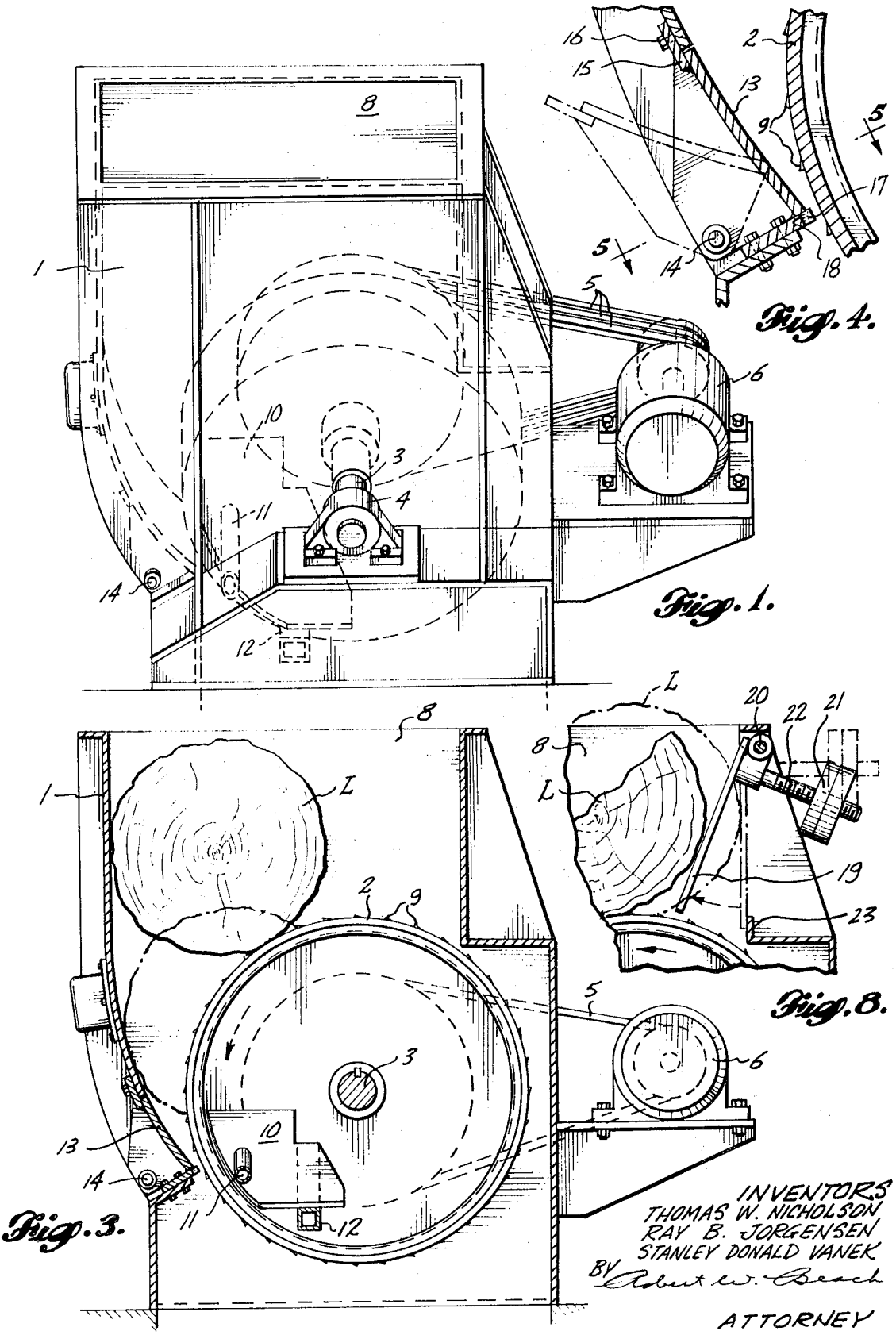

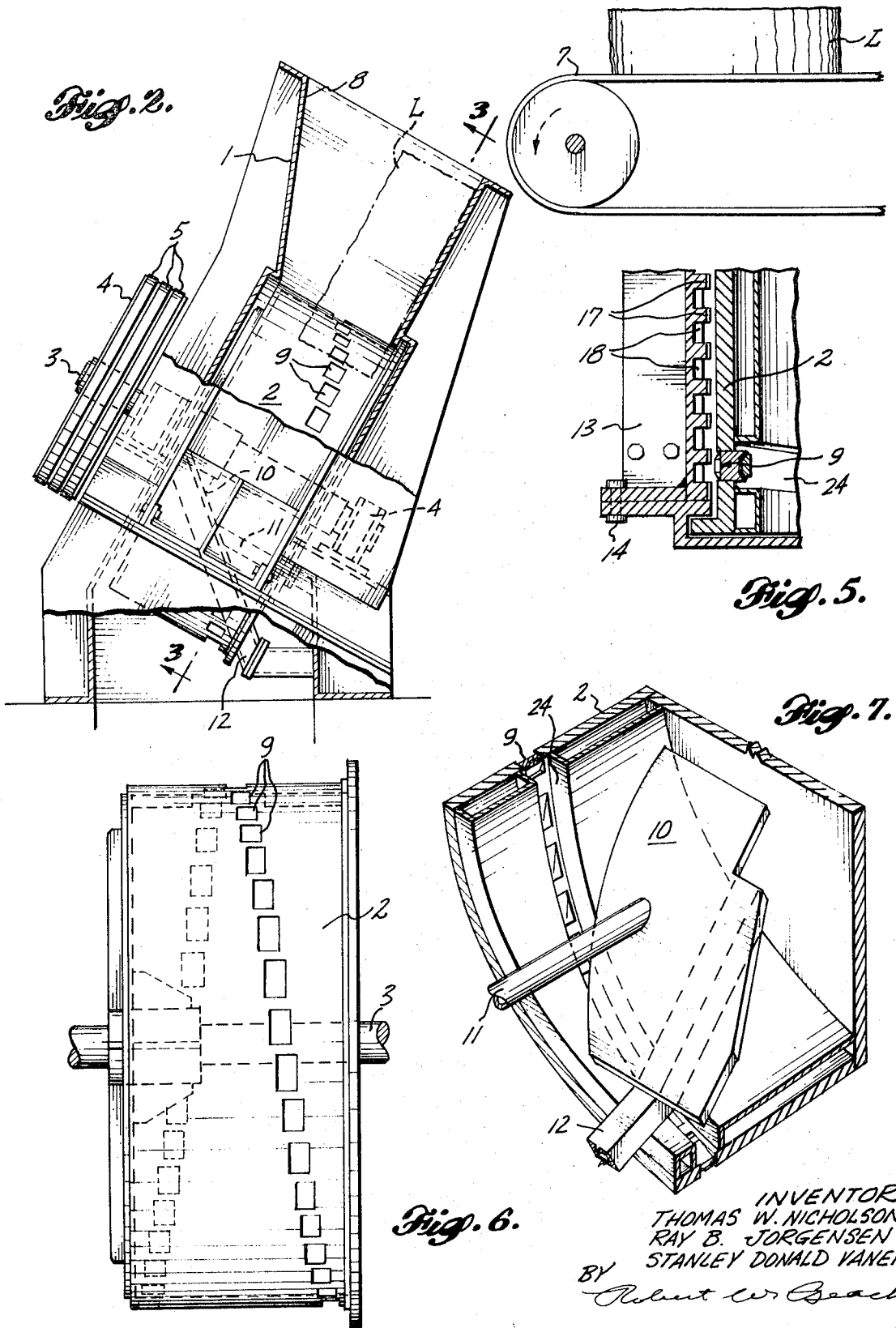

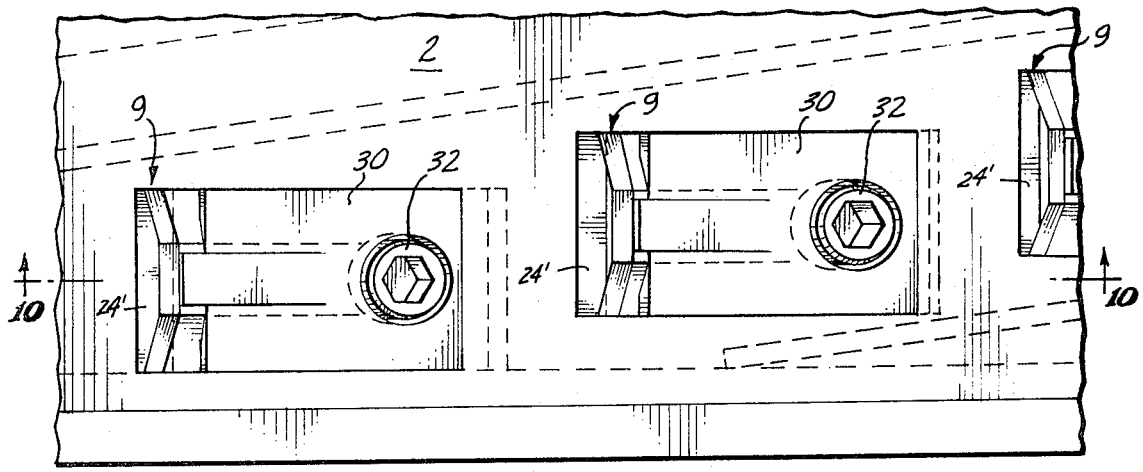
Fig. 9.
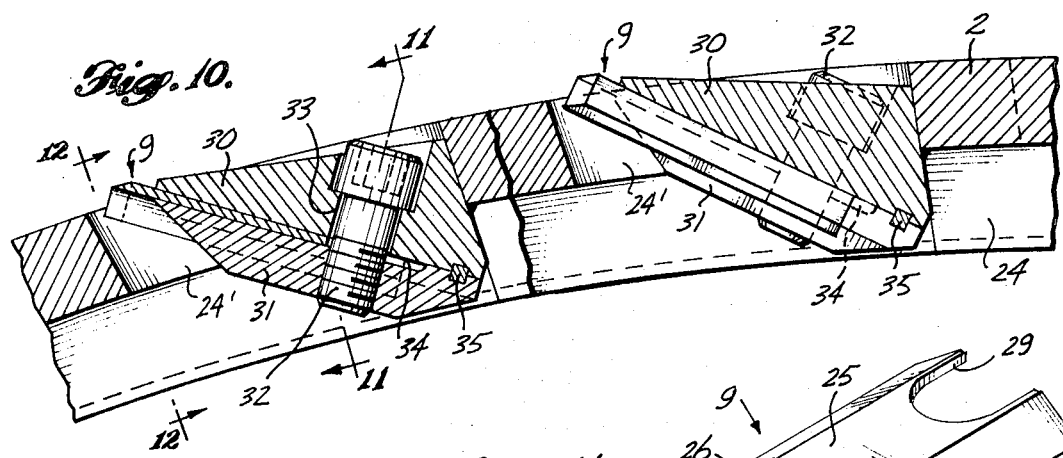
Fig. 10.
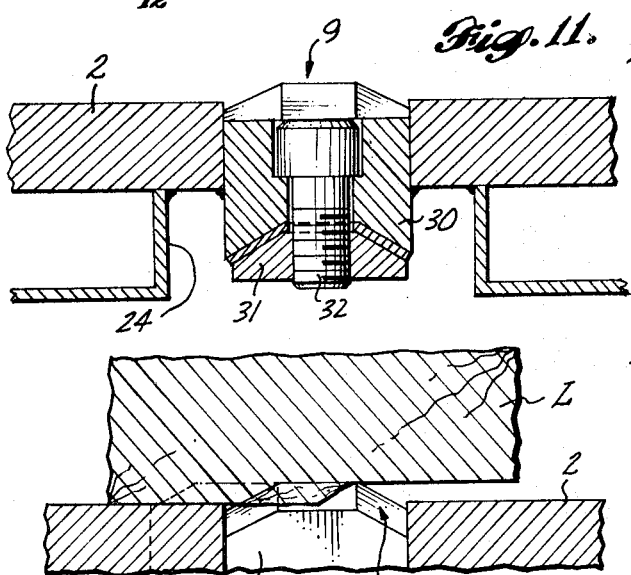
Fig. 11.
Fig. 12.
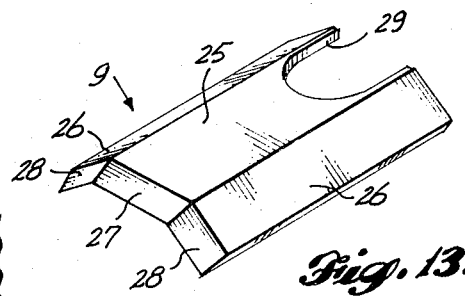
Fig. 13.
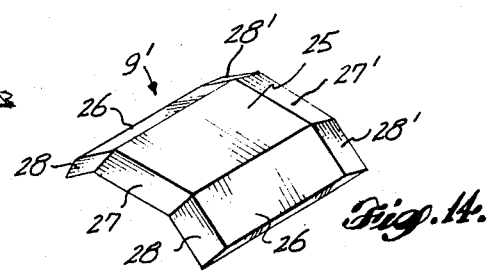
Fig. 14.
INVENTOR
THOMAS W. NICHOLSON
BY RAY B. JORGENSEN
STANLEY DONALD VANEK
Robert W. Beach
ATTORNEY

INVENTORS
THOMAS W. NICHOLSON
BY RAY B. JORGENSEN
STANLEY DONALD VANEK

ATTORNEY

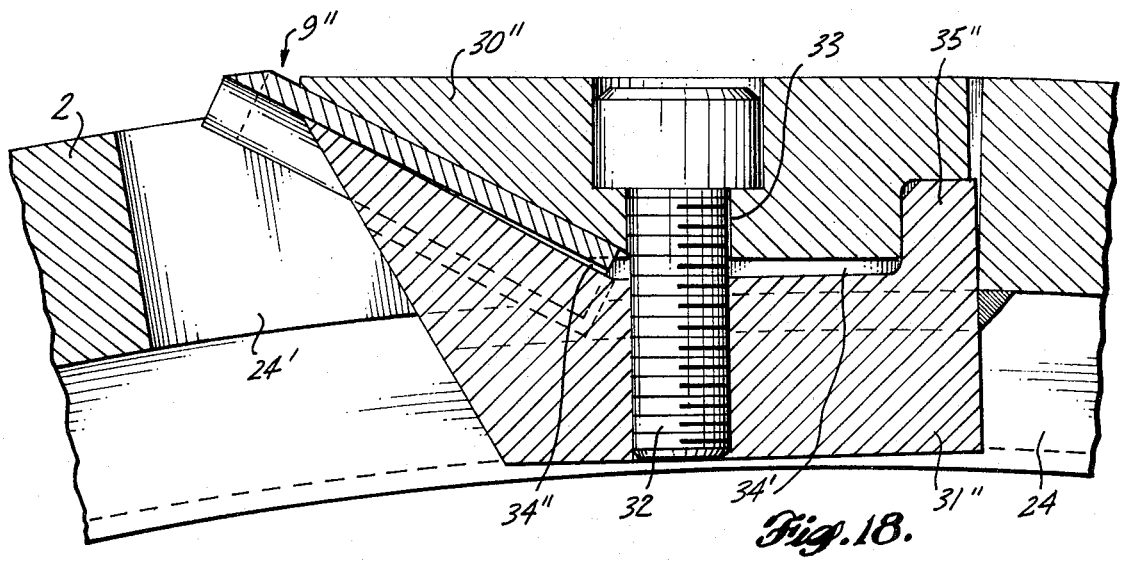
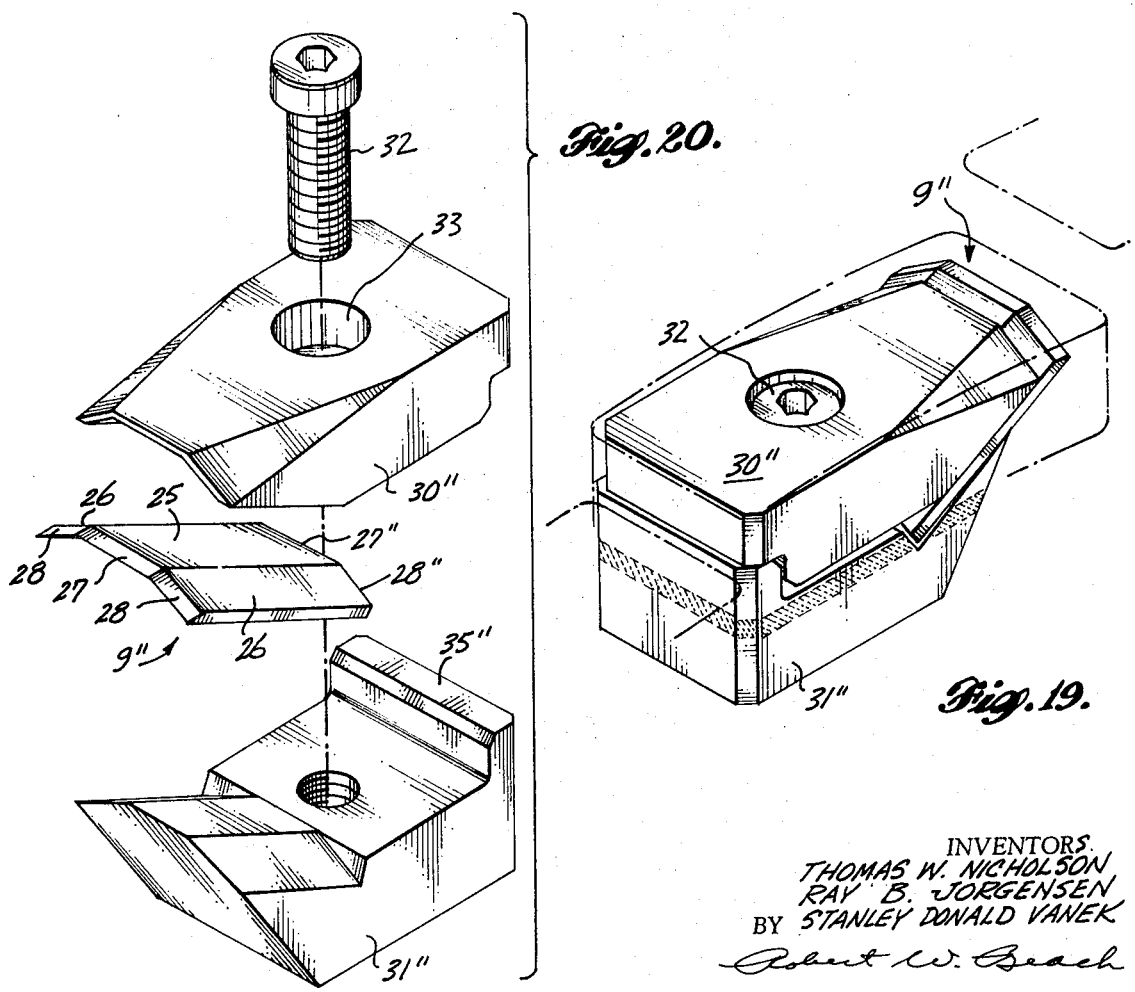

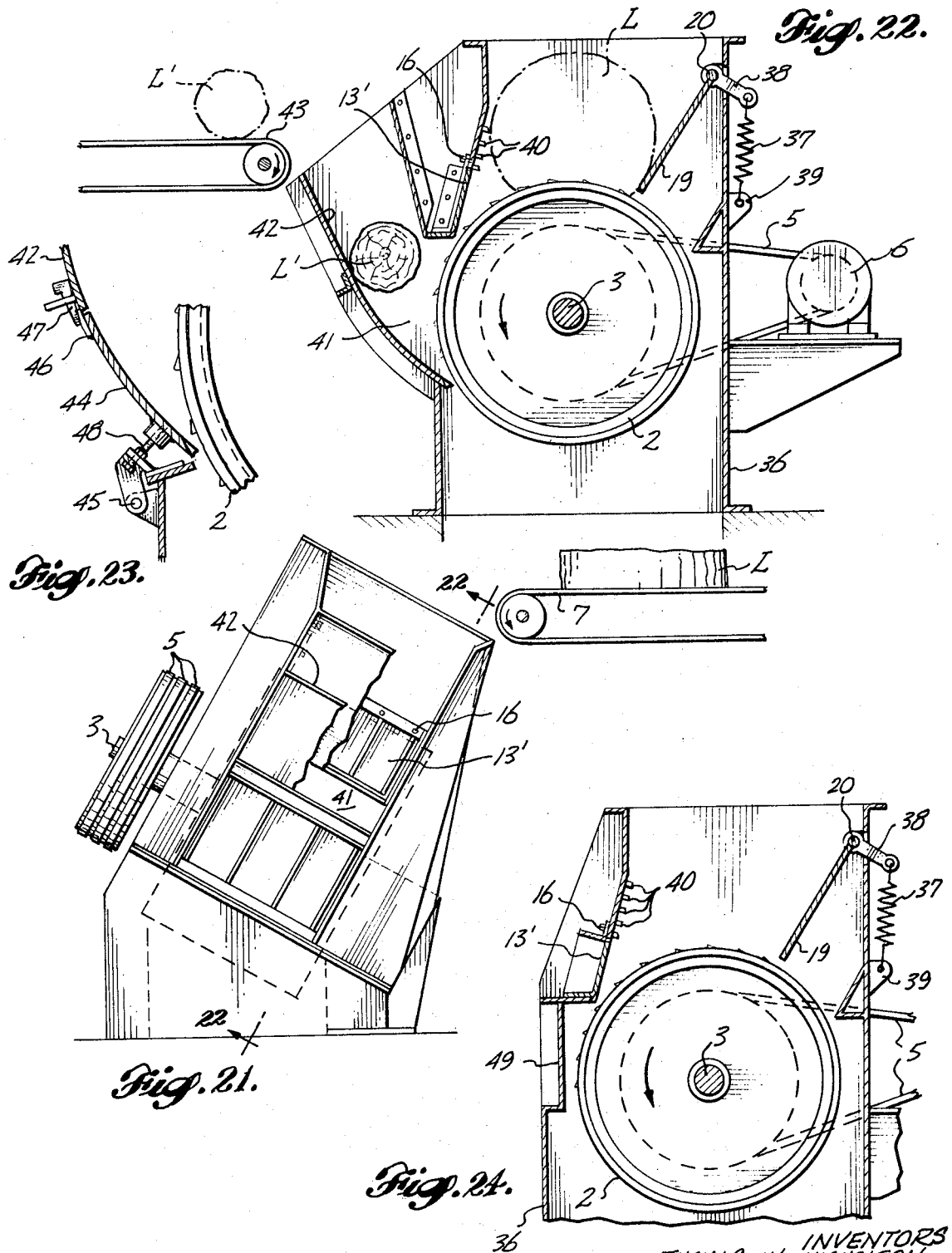

INVENTORS
THOMAS W. NICHOLSON
RAY B. JORGENSEN
STANLEY DONALD VANEK

PERIPHERAL CHIPPER FOR ROUND LOG SECTIONS

A principal object of the invention is to provide a chipper which can chip small log sections and particularly very short log sections, such as wheels, which are difficult to hold for chipping by conventional chippers.

A further object is to provide a chipper which will enable small log sections of various sizes and shapes to be fed to it automatically.

Another object is to accomplish chipping of small log sections quickly and completely.

It is also an object of the present invention to provide such a chipper which will produce chips of substantially uniform size and shape, and such object can be accomplished by providing an arrangement of chipping bits which will effect overlapping cuts.

An additional object is to facilitate removal of chips from the interior of the chipper drum.

It is also an object to provide chip-cutting bits which can be held securely in the periphery of a chipping drum, yet which can be removed, sharpened and replaced quickly.

FIG. 1 is an end elevation of one form of chipper.

FIG. 2 is a side elevation of such chipper with parts broken away.

FIG. 3 is a transverse section through the chipper taken on line 3—3 of FIG. 2.

FIG. 4 is a fragmentary section of a portion of the chipper shown in FIG. 3 on an enlarged scale.

FIG. 5 is a section taken on line 5—5 of FIG. 4.

FIG. 6 is a side elevation of the chipping drum on an enlarged scale.

FIG. 7 is a top perspective of a portion of such drum.

FIG. 8 is a fragmentary upright section showing a modified construction of a portion of the chipper.

FIG. 9 is a plan of a portion of the chipping drum on an enlarged scale.

FIG. 10 is a section of such drum portion taken on line 10—10 of FIG. 9.

FIG. 11 is a section through the same drum portion, taken along line 11—11 of FIG. 10.

FIG. 12 is a further section taken on line 12—12 of FIG. 10.

FIG. 13 is a top perspective of a cutting bit of the type shown in FIGS. 9, 10, 11 and 12.

FIG. 14 is a top perspective of an alternative type of cutting bit.

FIG. 18 is a fragmentary enlarged radial section through a portion of the chipping drum, showing another type of bit installation.

FIG. 19 is a top perspective of the bit installation shown in FIG. 18.

FIG. 20 is an exploded top perspective of such bit installation.

FIG. 21 is an end elevation of a further modified type of chipper.

FIG. 22 is a section through such chipper taken on line 22—22 of FIG. 21.

FIG. 23 is an enlarged fragmentary radial section through a portion of a chipper similar to that shown in FIGS. 21 and 22, but illustrating an alternative type of structure.

FIG. 24 is a radial section comparable to FIG. 22, showing a chipper of the same general type, but having a somewhat modified structure.

Figure 15:
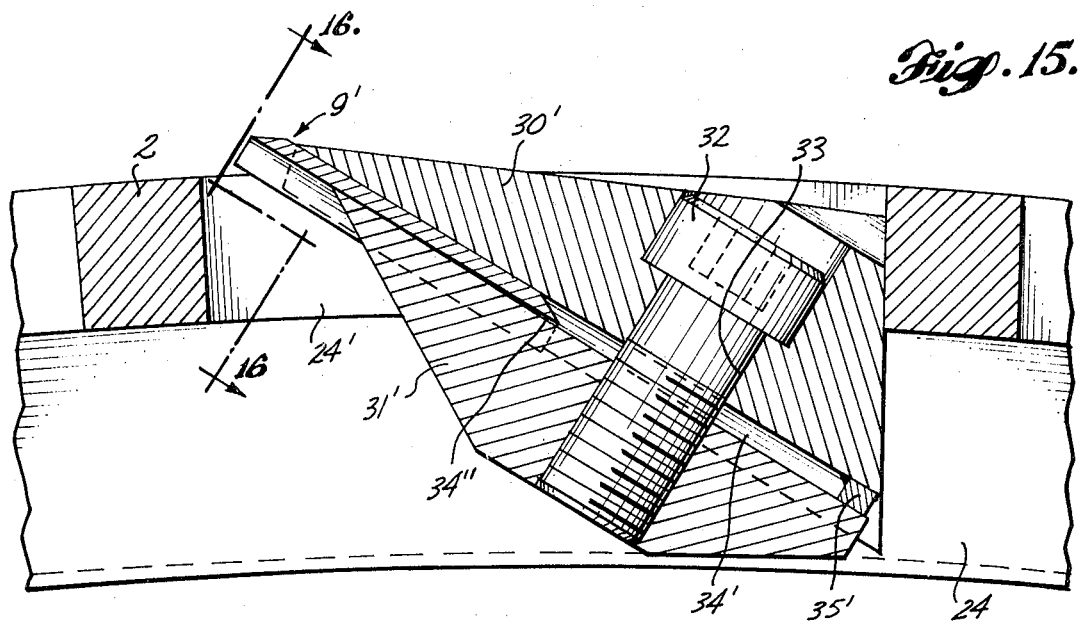
FIG. 15 is a fragmentary radial section through a portion of the chipper drum in which a bit of the type shown in FIG. 14 is mounted.
Figure 16:
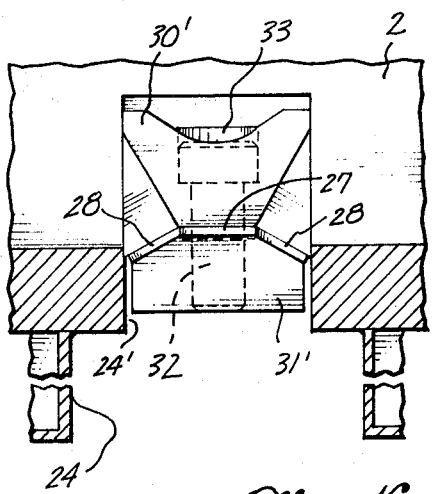
FIG. 16 is a section on line 16—16 of FIG. 15.
Figure 17:
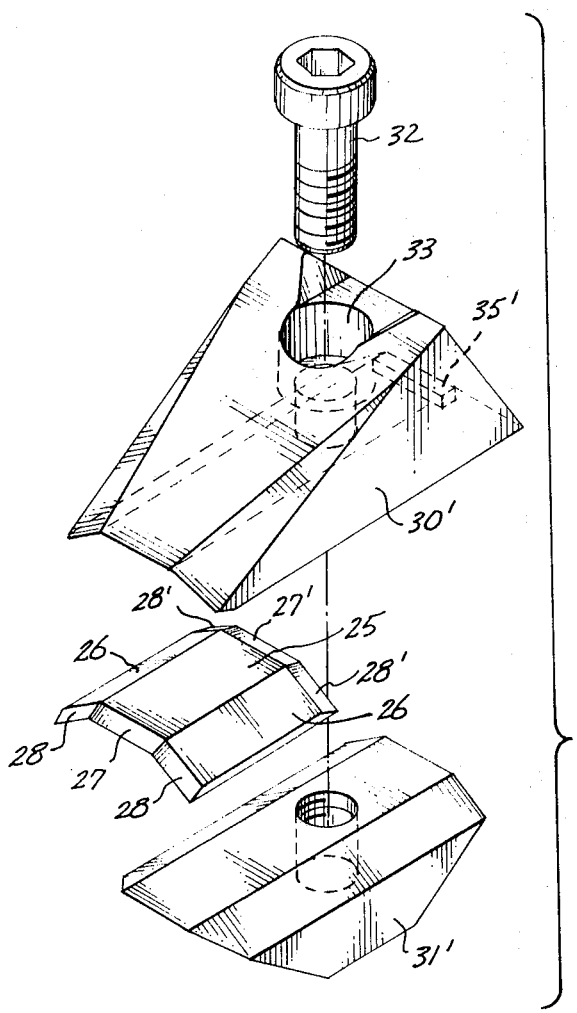
FIG. 17 is an exploded top perspective of the holding structure for a bit of the type shown in FIG. 14.

The chipper of the present invention is adapted for cutting small log sections into chips and for this purpose includes a hollow body 1 in which a chipping drum 2 is housed. Such drum is mounted for rotation on an axle 3 carrying a pulley 4 which can be rotated by one or more belts 5, shown in FIGS. 1 and 2, driven by a motor 6. Small log sections, and particularly those of short axial length such as the log wheel L shown in FIG. 2, can be delivered to the chipper by a supply conveyor 7.

The supply conveyor 7 will dump the log wheel L into the chipping chamber 8 in the upper portion of the hollow chipper body 1 in an attitude such that the axis of the log section extends generally parallel to the axis of the chipping drum. The axial extent of the log section is less than the corresponding width of the chipping chamber, as indicated in FIG. 2, in which the log section is shown in broken lines. Consequently, the periphery of the log round will substantially engage the periphery of the chipping drum. As shown in FIG. 2, the axle 3 may be tilted to incline the axis of the drum 2 so that movement of the drum periphery in contact with the periphery of the log round will tend to urge the log round to move down to the broken line position shown in FIG. 2 in which it is supported by the lower end wall of the chipping chamber, and consequently cannot tip over.

The chip-cutting bits 9 are arranged in a spiral row around the chipping drum 2, as shown best in FIGS. 2 and 6. Adjacent bits are arranged in sufficiently overlapping relationship so that as the drum turns chips are cut from the log round in successive layers. As shown in FIG. 6, each bit overlaps circumferentially the major portion of the width of each adjacent bit in an axial direction.

As shown best in FIGS. 9 to 12 the cutting bits 9 are received in apertures in the periphery of the drum 2, and the cutting ends of the bits project outward beyond the periphery of the drum and are spaced from the adjacent walls of the apertures to provide passages through the circumferential drum wall for chips cut from a log section. Consequently, it is necessary for this purpose to remove the chips from the interior of the drum. For this purpose chip-removing means are disposed within the drum which in the chipper shown in FIGS. 1, 2 and 3 is a chip-deflector plate 10, shown best in FIGS. 3 and 7 as being inclined axially of the chipping drum for scooping the chips endwise out of the drum during its rotation. Such deflector plate is supported and positioned by struts 11 and 12 secured to the chipper body.

As shown best in FIG. 3, the left wall of the chipping chamber 8 toward which the periphery of drum 2 turns is disposed in convergent relationship to the adjacent portion of the drum periphery. Rotation of the drum in the direction indicated by the arrow tends to move the log section in the direction of rotation of the drum periphery and to press the log section against such wall. Continued rotation of the drum engaging one location of the log section will cut successive layers of such location into chips so that such location of the log section will become concave complemental in curvature to the curvature of the chipping drum periphery. As more layers are removed from the log section, such section will move farther into the angle between the converging chipping chamber wall and the chipping drum periphery. If the log section initially is round, it eventually will assume a crescent shape in cross section, as shown in broken lines in FIG. 3.

Because of the direction of rotation of the chipping drum and the effect of such direction of rotation on the movement of the log section, any chips and debris which do not pass through the apertures in the drum periphery will tend to accumulate in the angle between the converging chipping chamber wall and the drum periphery. If excessive material collects in such angle, it can be removed through an opening closed by an access door 13 pivotally mounted on the hollow body by a pivot 14 to swing between the solid-line closed position shown in FIGS. 3 and 4 and the broken-line open position of FIG. 4. Such clean-out door can be held in closed position by securing the lug or tongue 15 carried by its swinging edge to the adjacent wall of the body 1 by a bolt 16. Such bolt can be removed and the lug or tongue pulled outward to swing the door open.

During operation of the chipper the edge 17 of a plate secured to the body 1 adjacent to the clean-out door 13 serves as an anvil. The anvil edge 17 is preferably in the form of fingers, as shown in FIGS. 4 and 5, between which are notches 18 that will enable small pieces of debris and small stones to escape from the space between the converging chipping chamber wall and the drum periphery.

In some instances it may be desirable to feed log sections to the chipping drum, particularly if more than one log section is placed in the chipping chamber at one time. For this purpose a swinging feed plate 19 may be mounted on the wall of the chipping chamber away from which the periphery of the drum 2 turns, as shown in FIG. 8. The feed plate 19 is mounted by a pivot 20, and its swinging edge is urged toward a log section in the chipping chamber 8 by a weight 21 in the form of a nut adjustable toward and away from the pivot 20 along a threaded mounting rod 22 projecting substantially perpendicularly from the feed plate 19. Outward swinging of the feed plate is limited by engagement of its swinging edge with a stop lip 23.

The spiral path around the drum 2 in which the bits 9 are mounted is delineated by a spiral groove 24 in the drum wall and opening into the interior of the drum, as shown best in FIGS. 7 and 10. The apertures 24' in the wall of the drum in which the bits are mounted are located in the bottom of this groove. The bits 9 are received in these apertures and extend through them at an angle to the drum periphery so that the cutting ends of the bits project outward beyond the drum wall, as shown best in FIGS. 10 and 12.

The cutting bits 9 are of dihedral cross section, including a first plate portion 25 and at least one other plate portion disposed at a dihedral angle to the first plate portion. In the cutting bit shown in FIG. 13 two planar side plate portions 26 are disposed in similar dihedral relationship to the central planar plate portion 25 between such side plate portions. One end of the central plate portion 25 is beveled to form a cutting edge 27, and the corresponding end portions of the side plate portions 26 have similar bevels 28 to form cutting edges. The cutting edges formed by bevels 27 and 28 are disposed in a plane which is substantially perpendicular to the plate portions 25 and 26 of the cutting bit.

In the bit 9 shown in FIG. 13 a deep notch 29 is provided in the butt end of the central plate portion 25 opposite its cutting edge end. When the bit is placed between an outer bit-holding block 30 and an inner bit-holding block 31, such notch will straddle a bolt 32 connecting the bit-holding blocks. In the construction shown in FIGS. 9, 10 and 11 such bolt extends through a shouldered aperture 33 in the outer bit-holding block 30 and is screwed into a threaded aperture in the inner bit-holding block 31.

The pair of bit-holding blocks 30 and 31 are of a size to fit into an aperture 24' in the drum periphery, and one of such blocks is anchored in a drum aperture such as by being welded in place. In the bit installation shown in FIGS. 9, 10 and 11 the outer bit-holding block 30 is welded in the drum aperture, and the inner bit-holding block 31 can be pulled toward the outer block into clamping engagement with a bit 9 between such block, by tightening rotation of the bolt 32.

The underside of the outer block 30 and the outer side of the inner block 31 are of complemental shape conforming substantially to the cross-sectional shape of the bit 9. The outer surface of the inner block 31 has in it a recess 34 of a depth slightly less than the thickness of the bit. Consequently, when the bolt 32 is tightened with the bit received in such recess and with the notch 29 straddling the bolt, the bit will be clamped firmly between the blocks. In order to locate the blocks accurately relative to each other longitudinally, a key 35 is engaged in registering keyways in the inner end portions of the blocks.

In installing a bit 9 the key 35 is located in the keyway of inner block 31, and such block is inserted within the drum and the key engaged in the keyway of block 30. Then bolt 32 is inserted through the aperture 33 in block 30 and screwed into the threaded aperture of block 31 to draw it outward. When the block 31 has been moved to a position close to block 30 while affording sufficient clearance between the blocks for reception of bit 9, the bit can be slid butt first through the aperture 24' between the blocks until it has been located with the desired degree of cutting end projection. The bolt 32 is then tightened to secure the bit firmly in this position.

While the bit 9, shown in FIGS. 9 to 13, has cutting edges at only one end, FIGS. 14 to 17 show a bit of similar cross-sectional shape but having cutting edges at both ends. If the cutting edges at one end should become dull the bits can simply be reversed end-for-end to present sharpened cutting edges 27' and 28' for engaging the log sections. Such a double-ended bit can be secured between the blocks 30 and 31 described in connection with FIGS. 9 to 12. It is preferred, however, that such a bit be mounted by the blocks 30' and 31', shown in FIGS. 15, 16 and 17.

In general the operation of the bit-clamping blocks 30' and 31' is similar to that of blocks 30 and 31. In this instance, however, the blocks 30' project farther beyond the periphery of the drum 2 to provide better backing for the projecting end portion of the bit 9'. The cutting edges 27 and 28 will still project beyond the end of block 30'. The opposite cutting edges 27' and 28' will be received in the cavity 34' at the outer side of bolt 32. The corners of the projecting portion of block 30' are chamfered, as shown best in FIG. 17, to avoid contact with the log round.

The inner block 31' is thicker than the block 31 to provide greater rigidity. Also, in place of the key 35 a fulcrum block 35' is secured to the underside of the outer block 30', and such fulcrum block is thicker than the bit. Consequently, as the bolt 32 is tightened, the outer tip of block 31' will be pressed against the underside of the bit to concentrate the clamping pressure near the tip of the bit and provide clearance 34'' between the inner block 31' and the inner end portion of the bit. Such block assembly clamps the bit more securely than the assembly of FIGS. 9 to 12.

In FIGS. 18, 19 and 20 a further modified pair of bit-clamping blocks is shown. Such blocks are illustrated as clamping a bit 9'' which has the same shape of cross section as the bits 9 and 9' described previously. In this instance, however, the butt of the bit has square end portions 27'' and 28'' instead of being sharpened. The blocks of FIGS. 18, 19 and 20 could, however, be used to clamp the bit of the 9' type if desired instead of the bit 9''.

While the outer blocks 30 and 30' described above have been anchored in the drum apertures 24' by welding, the block 30'' shown in FIGS. 18, 19 and 20 is loose. Instead the inner block 31'' is anchored in the aperture 24' by welding. Also, instead of the blocks 30'' and 31'' being connected by a key, the inner block 31'' has an outwardly projecting lug 35' fitting in a recess in the butt of the outer block 30''. Such outer block has an aperture 33 through which a bolt 32 extends, and this bolt is screwed into a threaded aperture in inner block 31' to draw the outer block into bit-clamping relationship by tightening the bolt.

In this instance also the inner block has an outer recess 34' in which the bit 9'' is received. Such recess and lug 35'' are proportioned to provide clearance 34'' between the inner block 31'' and the butt of the bit 9''. Again, therefore, as the bolt 32 is tightened the clamping pressure of the blocks on the bit will be concentrated at the outer ends of the blocks adjacent to the bit cutting end, as shown best in FIG. 18.

In FIGS. 21 and 22 a modified chipper is shown having a hollow body 36 providing an upper chipping chamber similar to that shown in the chipper of FIGS. 1, 2 and 3. Such chipping chamber has a feed plate 19 swingably mounted by a pivot 20 similar to the feed plate described in connection with FIG. 8. In this instance, however, instead of a weight being provided to swing the feed plate, a tension spring 37 interconnects an arm 38 projecting from the pivoted end of the plate 19 and an anchoring lug 39 on the body 36. The action of such plate is similar to that shown in FIG. 8, but is somewhat more positive. Also, spikes 40 projecting inwardly from the wall of the chipping chamber converging with the periphery of the drum can be engaged by a log round L to deter rotation of such round.

This chipper has a second chipping chamber at the side of the drum 2 to which a portion of the drum periphery is exposed through the opening 41. The chipping chamber 42 is shown in FIG. 22 as being narrower than the chipping chamber 8 to receive log rounds L' of smaller diameter than would normally be chipped in the chipping chamber 8. Also, such log rounds may be longer than the rounds L. Such rounds can be fed to the chipping chamber 42 by a conveyor 43.

FIG. 23 shows an access and clean-out door 44 at the bottom of the chipping chamber 42. Such door is swingably supported by a pivot mounting 45 at its lower end, and a lip 46 projecting beyond its upper end can be secured by a latching wedge 47. The lower portion of the door may be supported from its pivot mounting by adjusting screws 48, which can be moved to vary the proximity of the lower portion of the door to the periphery of drum 2.

The chipper shown in FIG. 24 is similar to that of FIGS. 21 and 22 except that the secondary chipping chamber has been omitted. Instead the opening 41 of the chipper shown in FIGS. 21 and 22 is replaced by a closure wall 49. The other parts of this chipper are similar to the parts described in connection with FIGS. 21 and 22.

Figure 25:
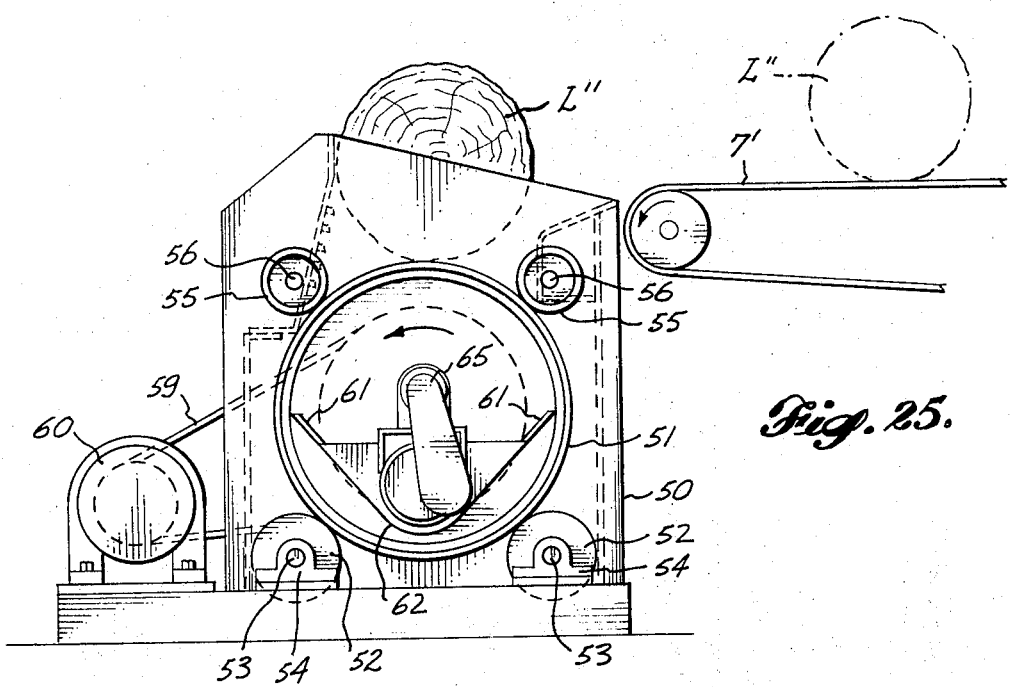
FIG. 25 is an end elevation of another type of chipper according to the present invention.
Figure 26:
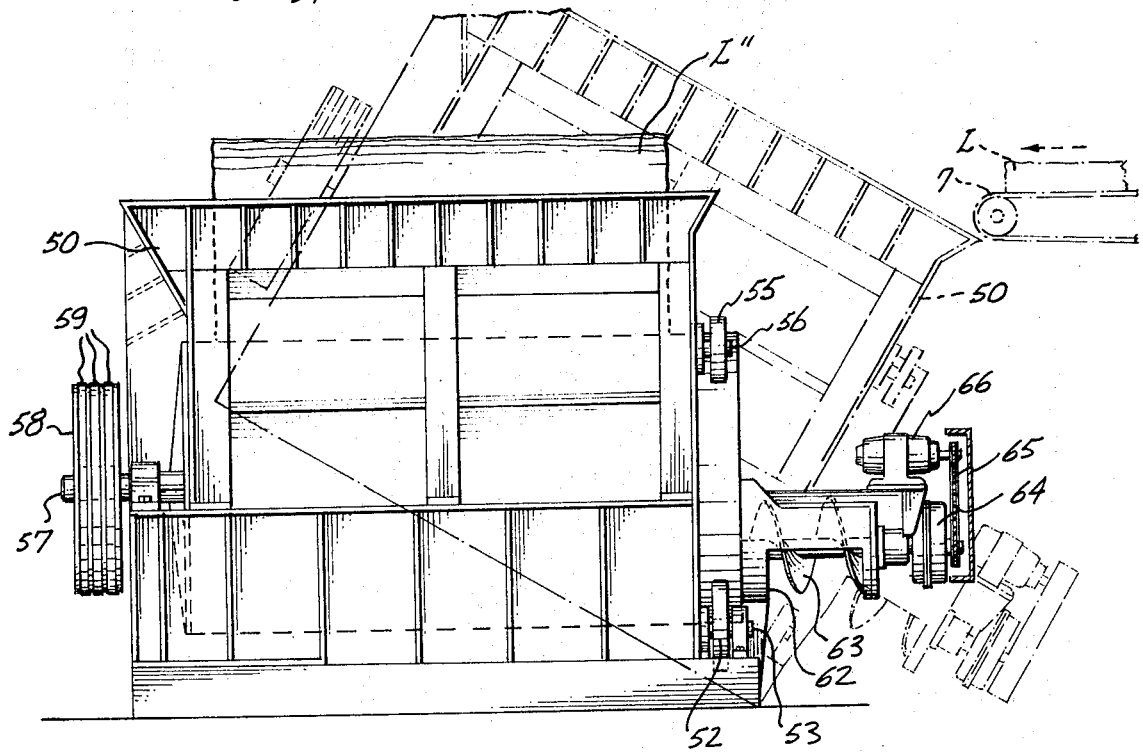
FIG. 26 is a side elevation of such chipper showing an alternative position of the chipper in broken lines.

Still a different type of chipper construction is shown in FIGS. 25 and 26. In this instance the hollow body 50 has a chipper drum 51 mounted in it having chipping bits mounted on its periphery of any of the types described above. One end of the drum rests on rollers 52 mounted on axles 53 received in bearings 54. The drum is held in place on such rollers by hold-down rollers 55 mounted on axles 56 and bearing against the upper portion of the drum. The opposite end of the drum is supported by an axle 57 which is turned by a pulley 48. This pulley is driven by one or more drive belts 59 powered by motor 60.

The chipper of FIGS. 25 and 26 has a longer chipping chamber than the chipper shown in FIGS. 1, 2 and 3. Longer log rounds L" can be fed to such chipping chamber by a supply conveyor 7'. Because the log rounds L" are of considerably greater axial length than the log wheels L, the chipper body can be arranged so that the axis of the chipping drum is horizontal, as shown in solid lines in FIG. 26. Consequently, it is necessary to remove the chips from the interior of the drum 51 other than by gravity.

Particularly in FIG. 25 downwardly convergent chip-catching plates 61 are shown, which are joined by a trough 62. A screw conveyor 63 located in such trough can be driven by reduction gearing 64 to move the chips out one end of the trough. Such reduction gearing is driven by a chain 65 powered by a motor 66, as shown in FIG. 26.

While, as has been discussed above, the chipper shown in FIGS. 25 and 26 is particularly suitable for chipping log rounds of a length greater than wheels, the same chipper can be used satisfactorily for chipping log wheels L which can be fed to it by a supply conveyor 7. In this instance, however, the chipper body 50 should be tilted into the broken-line position shown in FIG. 26 so that the wheels will gravitate toward the lower end of the chipping chamber to prevent them from falling over.

We claim:

1. A peripheral chipper comprising a hollow body having therein a chipping chamber, a rotary chipping drum including a plurality of bits arranged in a spiral row around the periphery of said chipping drum and having cutting edges projecting generally tangentially from the periphery of said drum, and means mounting said chipping drum below said chipping chamber for rotation with a portion of its periphery exposed to said chipping chamber for engagement by a log section in said chamber, said chipping chamber including a wall toward which the upper portion of the periphery of said drum moves including an upper substantially vertical portion extending downward from the upper edge of said chipping chamber and a fixed lower portion converging from said substantially vertical upper portion at an acute angle to the adjacent portion of said chipping drum periphery.

2. The chipper defined in claim 1, in which the drum mounting means mounts the chipping drum with the upper side of its periphery inclined for urging a log section in the chipping chamber toward the lower portion of the drum periphery upper side, and the lower end wall of the chipping chamber is substantially perpendicular to the upper side of the drum periphery.

3. The chipper defined in claim 1, and chip-removing means disposed within the chipping drum and extending through substantially the entire length of the drum.

4. The chipper defined in claim 1, in which the periphery of the chipping drum has in it apertures arranged in a spiral row, each adapted to receive a single cutter bit, each bit is a bent plate, and a pair of bit-holding blocks for each bit including an inner block and an outer block between which a bit is clamped, said inner block being permanently secured in an aperture of the chipping drum and said outer block being removably secured to said inner block.

5. The chipper defined in claim 1, and a notched anvil mounted adjacent to the periphery of the chipping drum on the chipping chamber wall convergent with an adjacent portion of the drum periphery.

6. The chipper defined in claim 3, in which the chip-removing means includes a deflector plate inclined axially of the chipping drum for scooping the chips endwise out of the drum during its rotation.

* * * * *